Dec. 20, 1949     H. A. SEIFRIED     2,491,835
DEVICE FOR SHUTTING OFF SPRINKLER VALVES
Filed Dec. 3, 1945
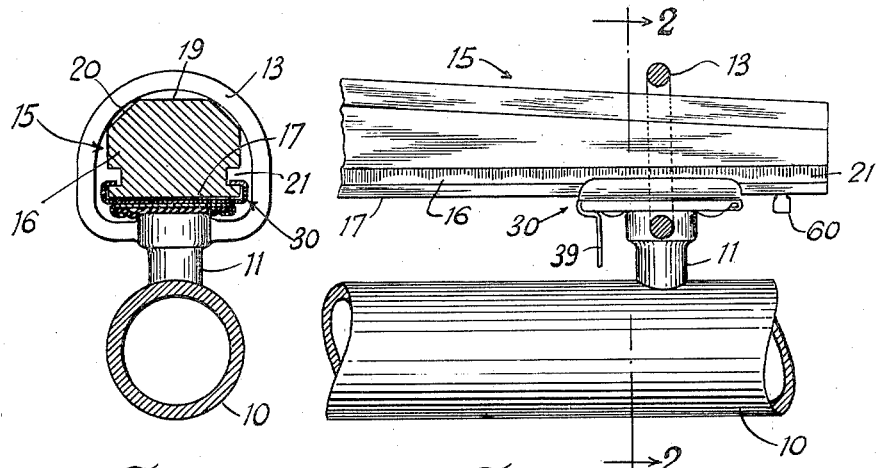
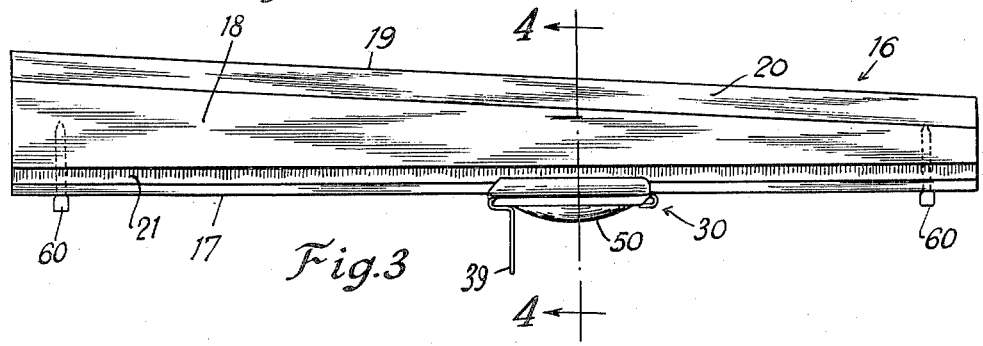
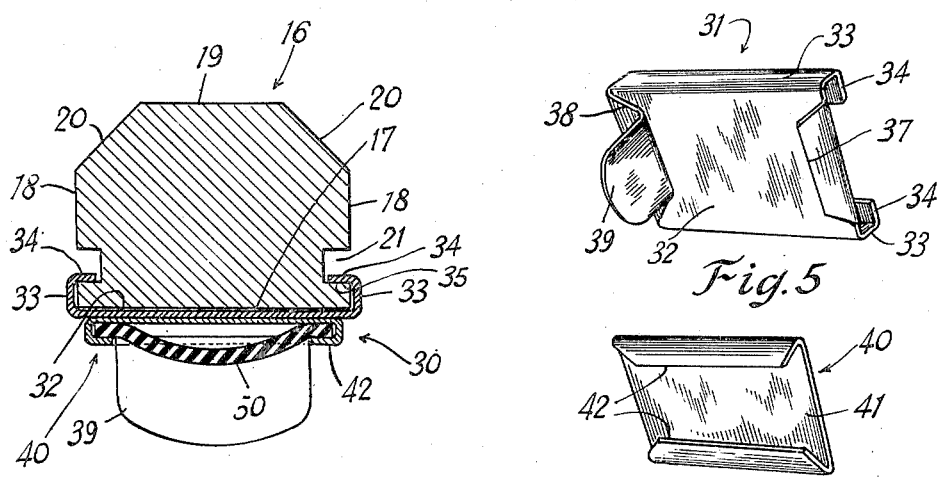
INVENTOR
Herman A. Seifried
BY
J. B. Felshin
ATTORNEY Patented Dec. 20, 1949

2,491,835

UNITED STATES PATENT OFFICE 2,491,835

DEVICE FOR SHUTTING OFF SPRINKLER VALVES

Herman A. Seifried, Flushing, N. Y.

Application December 3, 1945, Serial No. 632,452

2 Claims. (Cl. 169—1)

This invention relates to devices for shutting off sprinkler valves.

When a sprinkler valve of a sprinkler system opens to sprinkle water, as for example in case of fire and firemen appear on the scene, the sprinkler valves are shut off, usually in many makeshift ways. Such makeshift ways have not proved successful. It is therefore an object of this invention to provide a highly improved shut off device of the character described and comprising generally of a wedge-shaped member and a sliding gasket thereon, the arrangement being such that the wedge-shaped member may be inserted into the loop on the sprinkler valve with the gasket contacting the sprinkler valve opening. As the wedge is forced into the loop, the gasket will be progressively depressed against the valve opening to shut it off.

Another object of this invention is to provide a device of the character described in which the gasket is provided with a stop adapted to engage the sprinkler so that as the wedge is pushed through the loop, the gasket will remain in position over the sprinkler opening to close the same.

Yet a further object of this invention is to provide in a device of the character described a pair of end stops on the wedge to limit movement of the gasket thereon in opposite direction.

Still another object of this invention is to provide in a device of the character described, a highly improved gasket which may be cheaply manufactured and easily assembled and which shall slide easily on the wedge.

Yet a further object of this invention is to provide a strong, rugged and durable shut off device of the described manner which shall be relatively inexpensive to manufacture, easy to manipulate and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a side elevational view of a portion of a sprinkler system showing a shut off valve in position for use with parts in cross-section;

Fig. 2 is a cross-sectional view taken on line 2—2 of Fig. 1;

Fig. 3 is a side elevational view of the cut off device embodying the invention;

Fig. 4 is a cross-sectional view taken on line 4—4 of Fig. 3;

Fig. 5 is a perspective view of one part of the gasket frame; and

Fig. 6 is a perspective view of another part of the gasket frame.

Referring now in detail to the drawing, 10 designates a water pipe which may form part of a sprinkler system. Connected to pipe 10 at spaced intervals are the usual upwardly extending tubes 11 each provided with a usual sprinkler valve which may be closed by a plug of low melting point. Connected to each tube 11 and extending upwardly therefrom is a loop 13. In case of fire, the usual plug opened sprinkler valve melts causing the water to sprinkle upwardly.

In accordance with the present invention, there is provided a device 15 for quickly shutting off the sprinkler valve should the necessity arise. The cut off device 15 comprises a wedge 16 which may be made of wood or any other suitable material. The wedge 16 has an undersurface 17 and side surfaces 18 and a top surface 19. The top surface 19 is inclined toward the bottom surface 17. The upper corners of the wedge may be bevelled longitudinally as at 20. The side surfaces 18 are formed with similar aligned grooves 21 extending from one end to the other of the plug.

Slidably mounted on the plug or wedge is a gasket 30. The gasket 30 comprises a slider 31 shown in Fig. 5. The slider 31 may be made of sheet metal and comprises a wall 32 contacting the underside 17 of the wedge. Extending upwardly from opposite sides of wall 32 are web portions 33 engaging the outer surfaces 18 of the wedge below the groove 21. Extending inwardly from portions 33 are flanges 34 which project into the grooves 21 and slidably engage the lower surfaces 35 of said grooves. Extending downwardly from one end of wall 32 is an inwardly bent lip 37. Extending from the other end of wall 32 is an inwardly bent lip 38 formed with a downwardly extending tongue or stop member 39.

Mounted on member 31 in the manner hereinafter appearing is a gasket holder 40 shown in Fig. 6. The gasket holder 40 comprises wall 41 from opposite sides of which extend inwardly projecting lips 42. A gasket element or pad 50 which may be in the form of a piece of rubber or the like compressible material is clamped by member 40. The opposite edges of pad 50 are gripped tightly by the lips 42. The holder 40 is attached to member 31 by placing wall 41 against the underside of wall 32 and pressing the lips 37, 38 against the ends of the rubber piece 50. In this manner all four edges of the rubber piece 50 are gripped. It will be noted that the lips 37, 38 are at right angles to the lips 42 thereby in effect forming a frame for the rubber piece 50.

Attached to the underside of the wedge 16 adjacent the ends thereof are nails 60 serving as stops to limit sliding movement of the gasket member 30 in opposite directions.

It will be noted that the stop tongue 39 is remote from the narrow end of the wedge.

The method of using the device will now be described:

In the event that a sprinkler valve opens and it is desired for any reason to shut it off, the wedge is inserted within the loop 13 with the small end of the wedge going in first and the undersurface 17 toward the bottom. When the narrow end is inserted, the gasket member 30 is over the sprinkler valve opening, and as the wedge is pushed into the loop the rubber member 50 will be pressed tight against the valve opening to shut it off.

It will be noted that the stop member 39 may contact the valve or tube 11 to retain the gasket over the valve opening as the wedge is pushed in tightly.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A device of the character described comprising a wedge formed with longitudinal grooves on opposite faces thereof parallel to the underside of said wedge, a gasket assembly comprising a slider having a wall contacting the underside of the wedge and upwardly and inwardly turned means engaging within said grooves, said slider being formed at opposite ends thereof with inwardly turned lips, a pad holder comprising a wall having lips at opposite sides thereof, and a pad on said pad holder held against said member by means of the lips thereon, said pad holder being mounted against the underside of said slider and clamped to said slider by means of the lips on said slider engaging the end edges of said pad holder and pad.

2. A device of the character described comprising a wedge formed with longitudinal grooves on opposite faces thereof parallel to the underside of said wedge, a gasket assembly comprising a slider having a wall contacting the underside of the wedge and upwardly and inwardly turned means engaging within said grooves, said slider being formed at opposite ends thereof with inwardly turned lips, a pad holder comprising a wall having lips at opposite sides thereof, and a pad on said pad holder held against said member by means of the lips thereon, said pad holder being mounted against the underside of said slider engaging the end edges of said pad holder and pad, one of the lips of the slider being provided with a downwardly extending tongue.

HERMAN A. SEIFRIED.

REFERENCES CITED

The following references are of record in the file of this patent:

UNITED STATES PATENTS

| Number | Name | Date |
| --- | --- | --- |
| 843,556 | Boden | Feb. 5, 1907 |
| 1,167,860 | Dillen et al. | Jan. 11, 1916 |